June 30, 1936.         J. C. COEN                2,045,835
            AUTOMATIC SPEED CHANGING DEVICE
                Filed Dec. 7, 1934        3 Sheets-Sheet 1
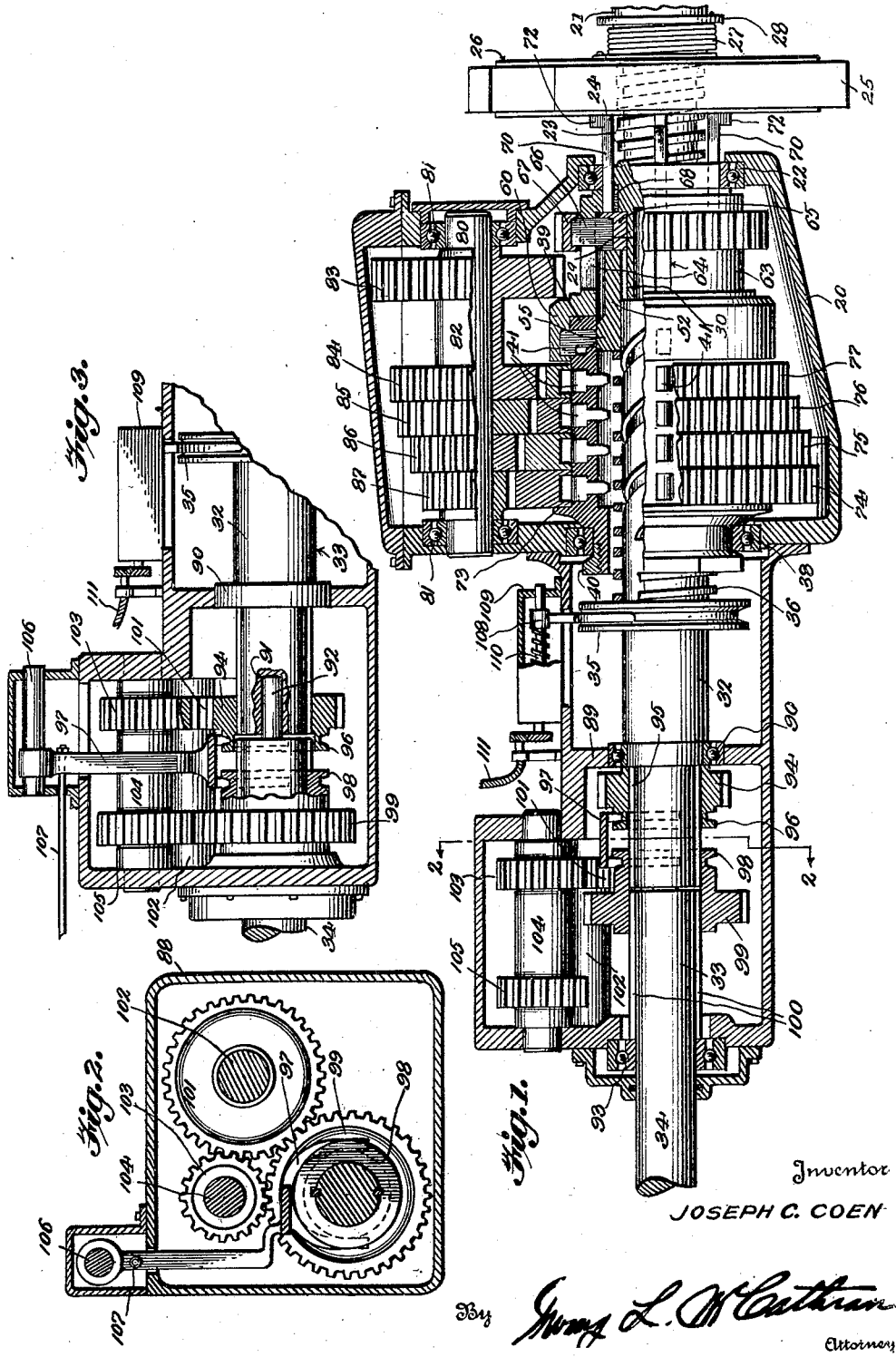
Inventor
JOSEPH C. COEN June 30, 1936.  J. C. COEN  2,045,835
AUTOMATIC SPEED CHANGING DEVICE
Filed Dec. 7, 1934   3 Sheets-Sheet 2
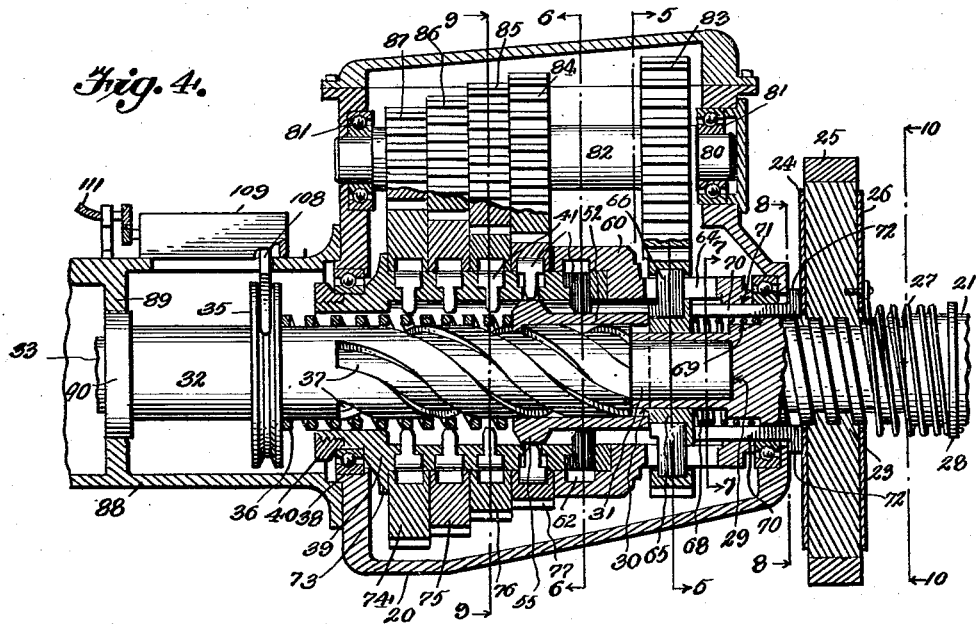
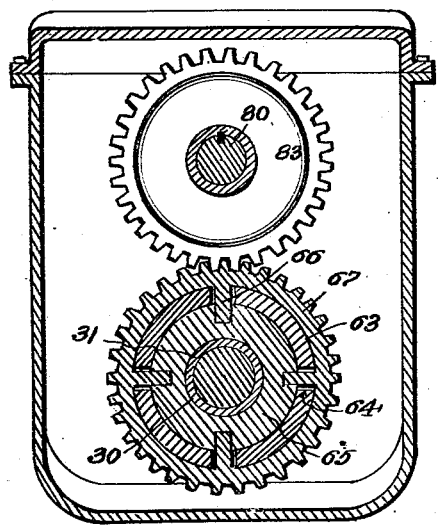
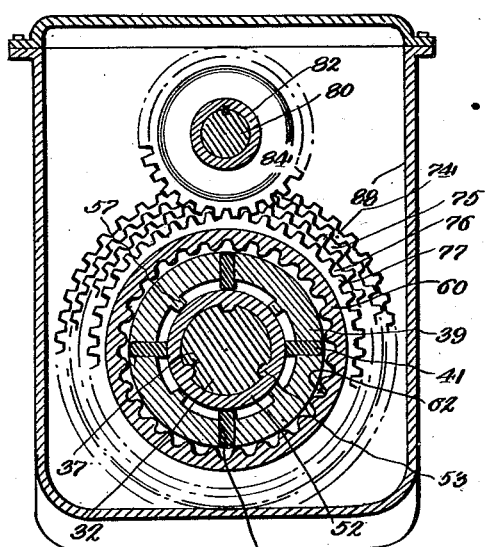
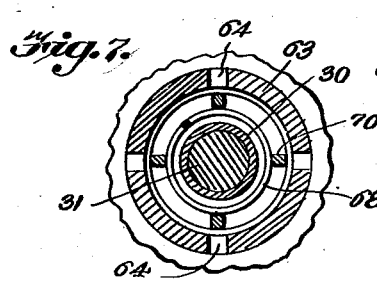
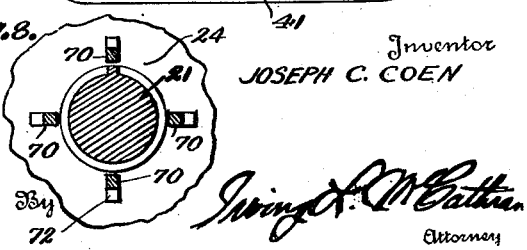
Inventor
JOSEPH C. COEN
Attorney June 30, 1936. J. C. COEN 2,045,835
AUTOMATIC SPEED CHANGING DEVICE
Filed Dec. 7, 1934   3 Sheets-Sheet 3
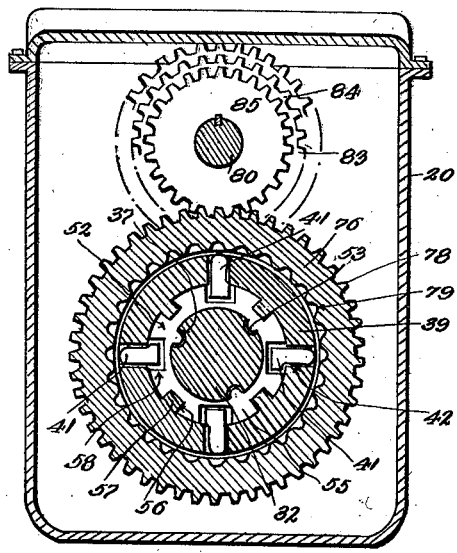
Fig. 9.
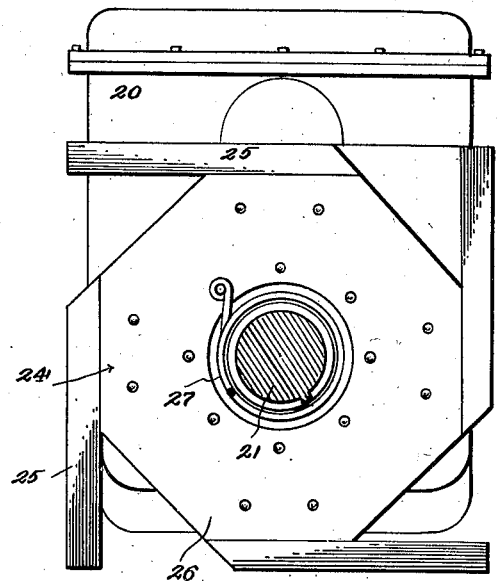
Fig. 10.
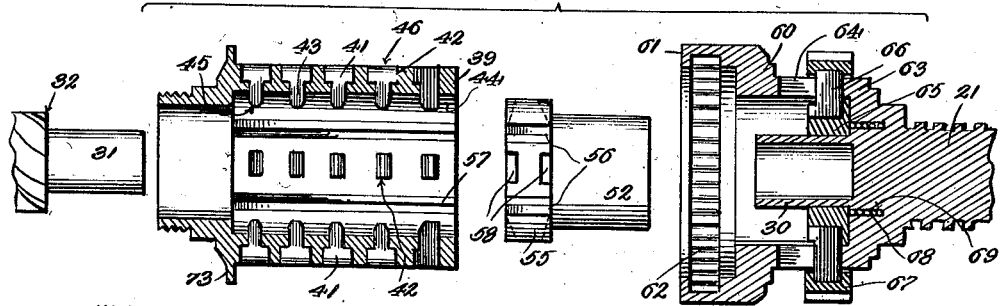
Fig. 11.
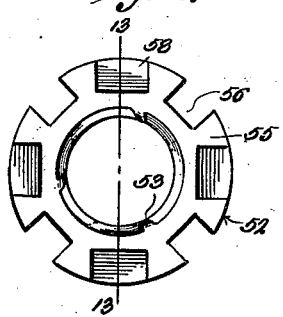
Fig. 12.
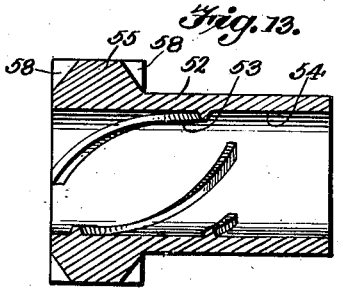
Fig. 13.
Fig. 14.
Fig. 15.
Fig. 16.
Inventor
JOSEPH C. COEN
By Irving L. McCathran
Attorney Patented June 30, 1936

2,045,835

UNITED STATES PATENT OFFICE 2,045,835

AUTOMATIC SPEED CHANGING DEVICE

Joseph C. Coen, San Bernardino, Calif.

Application December 7, 1934, Serial No. 756,526

8 Claims. (Cl. 74—337)

This invention relates to an automatic speed changing device for use in connection with various types of mechanisms, and more particularly to a speed changing device designed for use upon motor vehicles and the like.

An important object of this invention is the production of an efficient automatic pressure gear shift which is so constructed as to progressively and automatically bring the proper driving gear into action as pressure increases on the drive shaft sufficiently to pull the load, and which will automatically and progressively shift back to a higher gear as pressure is decreased upon the drive shaft.

Another object of this invention is the production of a simple and efficient automatic gear shift which will provide a smooth gear changing device whereby the change of gear will be controlled automatically in proportion to the speed of the driving engine and the drag or pull of the load upon the driving shaft.

A further object of this invention is the production of an automatic gear shift which is so constructed as to automatically throw the mechanism into second gear when the motor vehicle upon which the device is installed is stopped, or when the motor and vehicle are operating at a speed where the second gear drive is necessary, such for instance as while the vehicle is in heavy traffic.

Other objects and advantages of the present invention will be apparent throughout the following specification and claims.

In the drawings:—

Figure 1 is a longitudinal sectional view through the speed changing device, certain parts being shown in elevation and the parts being shown in high gear or in a position of direct drive;

Figure 2 is a section taken on line 2—2 of Figure 1;

Figure 3 is a longitudinal section through the casing supporting the reverse gear mechanism;

Figure 4 is a longitudinal sectional view through the speed changing device, certain parts being shown in elevation and the parts being illustrated in second gear;

Figure 5 is a section taken on line 5—5 of Figure 4;

Figure 6 is a section taken on line 6—6 of Figure 4;

Figure 7 is a section taken on line 7—7 of Figure 4;

Figure 8 is a section taken on line 8—8 of Figure 4;

Figure 9 is a section taken on line 9—9 of Figure 4;

Figure 10 is a section taken on line 10—10 of Figure 4;

Figure 11 is a longitudinal sectional view through the clutch means which controls the gear changing mechanism, the various parts being shown in a drawn-apart relation for the purpose of illustrating the construction thereof;

Figure 12 is an end elevation of the key operating sleeve;

Figure 13 is a longitudinal section of the key operating sleeve taken on line 13—13 of Figure 12;

Figure 14 is a top plan view of a portion of the key supporting drum illustrating the manner in which the keys are mounted;

Figure 15 is a section taken on line 15—15 of Figure 14;

Figure 16 is a fragmentary side elevation of a portion of one of the ring gears partly shown in section.

By referring to the drawings, it will be seen that 20 designates the casing or housing which supports the gear changing mechanism and into which the driving shaft 21 extends and is journaled within the bearings 22 carried by the forward end of the casing 20. This driving shaft 21 is provided with a worm thread 23, as shown particularly in Figures 1 and 4. Mounted upon this worm thread is a centrifugal disc 24 having radiating weighted arms 25 projecting from the periphery of the disc 24, as shown in Figure 10, these weighted arms extending in a direction parallel to the transverse axis of the driving shaft 21. The disc 24 may consist of a core upon which may be mounted suitable face plates 26, if desired, such as is illustrated in Figure 4. A coil spring 27 is fixedly secured to a collar 28 carried by the drive shaft 21 and this coil spring 27 is in turn connected to the front face of the centrifugal disc 24, as shown in Figures 1, 4 and 10, the purpose of this spring being to normally push the disc 24 back on the worm threads 23 when the shaft 21 is brought to rest or discontinues rotation, as shown in Figure 4. The centrifugal disc 24 is adapted to travel outwardly as the momentum of the shaft 21 increases, as shown in Figure 1. This mechanism puts the transmission in intermediate speed as the car slows down in traffic or is brought to rest.

The driving shaft 21 is provided with a socket 29 at its inner end and also a reduced extension 30, as will be obvious by considering Figure 4. This socket 29 receives the reduced extension 31 of the forward section 32 of the driven shaft 33. The driven shaft 33 also is provided with a section 34, as is shown in Figure 1, for the purpose hereinafter described. The section 32 of the shaft 33 is provided with a bearing ring 35 near its rear end, which bearing ring 35 constitutes an abutment for the rear end of the expansion spring 36 which is coiled about the forward section 32 of the driven shaft 33. This forward section 32 of the driven shaft 33 is provided with spiral channels 37, as shown in Figures 1 and 4, these spiral channels 37 extending for a portion of the length of the forward section 32 of the driven shaft 33.

The inner or rear end of the casing 20 carries a bearing 38 within which bearing 38 is journaled the inner or rear end of the key supporting drum 39. A locking collar 40 is carried by the drum 39 to hold the drum in engagement and in anchored relation with respect to the bearing 38. The drum 39 fits over the expansion spring 36 and constitutes a housing therefor, the spring 36 fitting between the key supporting drum 39 and the forward section 32 of the driven shaft 33. This key supporting drum 39 carries a plurality of key members 41 which are seated within sockets 42 formed in the drum 39, and these keys 41 are provided with inwardly extending shanks 43 projecting into the bore 44 of the drum 39, as shown in detail in Figure 11. These shanks 43 are preferably tapered, as at 45, at their inner ends to facilitate the moving of the keys outwardly with respect to the drum, as will be hereinafter described. Each key 41 is preferably provided with a rounded outer nose portion 46 and one side of each key 41 is provided with a shoulder 47 which is engaged by a tapering spring pressed pin 48 to normally hold the keys 41 in a retracted position and at the same time allow the keys to be extended and retracted as occasion may require. Each spring pressed pin 48 is mounted within a suitable socket 49 formed at the drum 39, and these sockets are closed at their outer ends by threaded plugs 50, as is shown in Figure 15.

Slidably mounted within the drum 39 is a key operating sleeve 52 which snugly fits over the forward section 32 of the driven shaft 33, this sleeve 52 having spirally threaded portions 53 formed on the inner face of the bore 54 and interfitting with the spiral channels 37 formed on the outer face of the section 32 of the driven shaft 33. The sleeve 52 is provided with an enlarged annular flange or head portion 55, the outer periphery of which is adapted to snugly engage the inner face of the bore 44 of the drum 39, as is shown in the assembled views in Figures 1 and 4, and this flange or head portion 55 is provided with slots 56 extending transversely of the head portion 55 or longitudinally of the sleeve 52, which slots receive the elongated ribs or keys 57 formed within the bore 44 of the drum 39, thereby permitting the sleeve 52 to slide longitudinally of the drum 39, but at the same time locking the sleeve 52 in anchored position against rotation independent of the drum 39. Intermediate the slots 56 and directly in the path of the aligned keys 41 which are carried by the drum 39 are formed inclined notches 58 upon the front and rear faces of the head portion 55, which notches extend toward the outer periphery of the flange or head portion 55 to provide inclined trackways which are adapted to engage the inner tapering ends 45 of the shank portions 43 of the keys 41 for the purpose of progressively extending the keys as the sleeve 52 moves longitudinally within the drum 39. As will be noted by considering Figures 9 and 11, there is preferably employed a series of aligned keys which, as will be hereinafter described are adapted to progressively engage the ring gears also to be hereinafter described. As many series of aligned keys may be employed as may be found desirable, but for present purposes four different series are illustrated in Figure 9, and under ordinary conditions this structure would be found sufficient.

A direct driving collar 60 is fitted over the forward end of the drum 39, as shown in Figures 1 and 4, and this direct driving collar 60 is provided with a projecting flange 61 which overhangs the forward end of the drum 39, and is provided with an internal gear or toothed face 62 for the purpose hereinafter described. This direct driving collar 60 is provided with a neck portion 63 having a plurality of longitudinally extending slots 64 formed therein.

A power gear 65 is slidably mounted upon the reduced extension 30 of the driven shaft 21 and is provided with radiating arms 66 which extend through the slots 64 and support an integral ring gear 67 at their outer ends thereby providing a power gear which may shift longitudinally of the direct driving collar 60. This direct driving collar 60 constitutes an integral part of the driving shaft 21, as will be noted by considering Figure 11. Consequently, the direct driving collar 60 will at all times rotate with the driving shaft 21. The power gear 65 is engaged by an expansion spring 68 which is mounted within a socket 69 formed in the inner end of the shaft 21. This spring normally urges the power gear 65 inwardly upon the reduced extension 30 of this shaft and normally holds the same in contact with the forward end of the key operating sleeve 54, and as this key operating sleeve 54 is moved forwardly the power gear 65 will be pushed forwardly against the expansion spring 68.

The power gear 65 is engaged by the inner ends of the pushing pins 70 which are slidably mounted through the forward end of the direct driving collar 60 by passing through the longitudinal slots 71. These pins 70 have laterally bent ends 72 which normally contact with the inner face of the centrifugal disc 24, as shown in Figure 4.

It should be noted that the threads 23 are right-hand threads and consequently, the momentum of the shaft 21 will move the disc 24 forwardly away from the case 20 and the spring 27 will push the disc 24 back as the momentum of the shaft decreases. This enables the rods 70 to move backward, allowing sleeve 52 to move backward into second gear. As the momentum increases, disc 24 moves forward allowing spring 36 to push sleeve 52 and rods 70 forward, putting the device in high gear.

As shown in Figures 1 and 4, the drum 39 is provided with an abutment flange 73 at the inner or rear end, it being noted that the direct driving collar 60 fits over the forward or outer end of the drum 39. Between the inner face of the direct driving collar 60 and the flange 73 are mounted in side-by-side relation the ring gears 74, 75, 76, and 77. Each ring gear is provided with gear teeth 78 upon the outer face thereof and a rounded toothed inner face 79, the rounded toothed inner face 79 being adapted to be engaged by the keys 41 for providing a clutching engagement between the selected ring gears and the drum 39, as will be hereinafter described. The inner toothed surface 62 of the driving collar 60 is also adapted to be engaged by one of the keys carried by the drum 39 for locking the direct driving collar in engagement with the drum 39 at a predetermined position of the parts as will also be hereinafter described.

toothed face 62 of the direct driving collar 60, thereby providing a direct connection between the driven and driving shaft. When the momentum of the vehicle or machine upon which the device is mounted slows down, necessitating the shifting of the parts from high gear, the decreasing of the momentum of the shaft 21 will cause the spring 27 to push the disk 24 back or inwardly, and this disc 24 will engage the forward ends of the pins 70, and because of the fact that the inner ends of these pins 70 contact with the forward face of the gear 65, this gear 65 will be pushed rearwardly into meshing engagement with the gear 83 and the sleeve 52 will also be pushed inwardly causing the keys 41 adjacent ring gear 77 to have clutching engagement with the ring gear 77, which ring gear is in mesh with the gear 84, thereby putting the parts again into second gear. Although various reducing gears, such as 84, 85, 86, and 87 have been illustrated, it is not desired to limit the present invention to any particular number of reducing gears which might be employed.

When it is desired to reverse the drive of the shaft 33, the clutch arm 97 may be shifted to bring the parts to the position shown in Figure 3, thereby obtaining a reverse drive as previously described.

It should be noted that the spring 68 will assist in holding the gear 65 at all times into abutting contact with the forward end of the sleeve 52 and cause the gear 65 to slide inwardly as this sleeve 52 is carried rearwardly. The collar 35 is held stationary or against shifting movement by means of the arm 108. The spring 36 is compressed as pressure increases thereon and expands as pressure is decreased. This will cause the sleeve 52 to move backward or forward as pressure is increased or decreased on the shaft 21. The collar 35 may be moved back or shifted from the control on the dash-board through the medium of the control shaft 111. In moving the collar 35 back, the tension on spring 36 is decreased and the sleeve 52 moves into lower gear. It should be understood that this mechanism is only used in case of emergency to get the transmission into lower gear, as for example when going down grade.

It should be understood that certain detail changes in the mechanical construction, combinations and arrangements of parts may be employed without departing from the spirit of the invention so long as such changes fall within the scope of the appended claims.

Having described the invention, what is claimed as new is:—

1. In a speed changing device, the combination with a driving shaft and a driven shaft, of a drum carried by the driven shaft, a series of different sized ring gears rotatably mounted upon the drum, clutching keys carried by the drum and adapted to be progressively moved into selective clutching engagement with the ring gears, a drive means for said driving shaft, keys for forming a locking connection between the drum and the drive means, sliding means mounted adjacent said drum for automatically and progressively moving the clutching keys to locking positions to individually and selectively render the ring gears and drive means active, a series of reducing gears meshing with the ring gears, a power gear carried by the driving shaft, a gear cooperating with the reducing gears adapted to mesh with said power gear, and centrifugally controlled means constituting an inertia member for shifting said power gear into driving position, and means operated by said last mentioned means for operating said sliding means.

2. In a speed changing device, the combination with a driven and a driving shaft, of a power gear slidably mounted upon said driving shaft, spring means for urging the power gear longitudinally of the driving shaft, a driving gear adapted to be engaged by said power gear as said power gear is moved longitudinally by said spring of said driving shaft, a direct drive collar carried by said driving shaft and rotating therewith, a sleeve slidably mounted upon the driven shaft, a drum carried by the driven shaft, spring means engaging the inner end of said sleeve, ring gears carried by the drum, keys carried by the drum and adapted to be progressively moved into engagement with the ring gears as said sleeve is moved longitudinally of the driven shaft, said driven shaft having spiral channels formed thereon, means carried by the sleeve and fitting in the channels for moving said sleeve longitudinally of said driven shaft against the tension of said spring in response to the load on said driven shaft thereby causing a relative movement between said last mentioned shaft and sleeve to bring said sleeve in contact with said keys and progressively move the keys into progressive engagement with the ring gears, the key to one ring gear disengaging as the key for the next adjoining ring gear engages, reducing gears in mesh with the ring gears, the reducing gears being driven by the drive gear, keys for locking the direct drive collar upon the drum, said keys being actuated by the sliding of said sleeve into engagement with the last mentioned keys, and said sleeve having abutting engagement with said power gear for automatically shifting the power gear out of engagement with the drive gear when said last mentioned keys are moved to an operative position for locking the direct drive collar upon said drum.

3. In a speed changing device, the combination with a driving shaft and a driven shaft, reducing gears, means for progressively and selectively making a driving connection between the reducing gears and the driven shaft, a driving gear for driving the reducing gears, a power gear slidably mounted upon the driving shaft, yieldable means for normally holding the power gear in an inactive position and out of mesh with said driving gear, and centrifugally controlled means constituting an inertia member carried by the driving shaft for automatically sliding the power gear into mesh with the driving gear when the speed of the driving shaft is increased to a predetermined degree.

4. In a speed changing device, the combination with a driving shaft and a driven shaft, reducing gears, means for progressively and selectively making a driving connection between the reducing gears and the driven shaft, a driving gear for driving the reducing gears, a power gear slidably mounted upon the driving shaft, yieldable means for normally holding the power gear in an inactive position and out of mesh with said driving gear, an inertia disc carried by the driving shaft, worm threads formed upon the driving shaft and engaging the disc for moving the disc longitudinally of the driving shaft when the speed of the driving shaft is increased, yieldable means for returning the disc to its normal position when the speed of the driving shaft is reduced, push pins interposed between the power gear and said disc for automatically shifting the power gear Adjacent the ring gears 74 to 77 inclusive, and located just above the same within the casing 20, is a supporting shaft 80 which is journaled at each end as at 81, and upon this shaft 80 is keyed a spool 82 having a gear 83 at one end located near the forward end of the casing 20, and a gear 84 arranged in spaced relation and located just above the ring gear 77. Also keyed to this shaft 80 are the gears 85, 86 and 87, which are keyed to the shaft 80.

Reverse mechanism

The casing 20 abuts against a housing 88 at its inner end and this housing 88 carries a partition 89 upon which is mounted a bearing 90 within which bearing is journaled the inner end of the section 32 of the driven shaft. The inner end of the section 32 of the driven shaft 33 is provided with a socket 91 for receiving the reduced extension 92 of the rear section 34 of the driven shaft 33, the rear section 34 of the driven shaft 33 being journaled in the journal 93 (see Figure 1). A gear 94 is slidably mounted upon the rear end of the section 32 of the driven shaft 33 and is keyed to rotate therewith through the medium of the keys 95 and this gear 94 is provided with a collar flange 96 which is engaged by the clutch arm 97. This clutch arm 97 also engages the collar 98 of the gear 99, which gear 99 is slidably mounted upon the rear section 34 of the driven shaft 33 and slides on the keys 100. The gear 99 may be moved to a position to overhang the abutting ends of the forward and rear sections 32 and 34 of the driven shaft 33, as is shown in Figure 1, thereby locking the sections 32 and 34 of the shaft 33 for unitary rotation. As shown in Figures 1 and 3, the collar 96 of the gear 94 is spaced slightly from the supporting shaft in order to prevent the gear 94 from coming into contact engagement with the forward end of the section 34 of the shaft 33 when the gears 94 and 99 are shifted into reverse position. As shown in Figures 2 and 3, the rear end of the housing 88 is enlarged to house the reverse gear mechanism, and a reverse driving gear 101 is journaled within the housing 88 upon the shaft 102, and is in a position to mesh with the gear 94 when this gear 94 is shifted rearwardly to the reverse position or to the position shown in Figure 3. Located to one side of the gear 101 and in constant mesh therewith, is a gear 103 carried by the spool 104, which spool 104 also carries the gear 105. As the clutch arm 97 is moved to a reverse position, the gears 94 and 99 will be moved to the position shown in Figure 3, thereby bringing into meshing relation the gear 99 with the gear 105. This gear 94 by being in mesh with the gear 101 will transmit motion to the gear 103 and consequently, to the gear 105, and then to the gear 99, and reversing the rotation of the rear section 34 of the driven shaft 33 thereby throwing the parts into what is known as reverse. The clutch arm 97 may be slidably suspended upon a supporting pin 106, and this arm 97 may be attached to a suitable operating rod 107 which rod may pass to the dash or to any suitable or convenient point of operation to permit the parts to be readily shifted from forward to reverse position, or vice versa.

In order that the parts may be mechanically shifted to throw the driving shaft into direct drive with the driven shaft, a suitable mechanism of any type may be employed, such for instance as a shifting arm 108 for contact with the bearing ring 35, which arm 108 may be slidably mounted within a casing 109 actuated by worm shaft 110, and controlled or operated through a suitable control shaft 111 leading from the dash. This device is used to release tension on spring 36 which in turn allows operating sleeve 52 to move down and change into a lower gear as necessary in coming down grades. This is to be operated from the dash board and tension released from spring 36 as needed, as stated above. This particular structure may be varied without departing from the spirit of the invention.

Operation

The operation of the device is as follows:—

When the machine upon which the device is mounted comes to a rest or to a stop, the power gear 65 will be in mesh with the gear 83 which is equivalent to the second gear of the conventional type of gear mechanism. Furthermore, when the speed of the machine upon which the device is mounted slows down to a minimum speed, in which the second gear normally would be used, the power gear 65 and the gear 83 will also be in mesh, the power gear 65 being forced toward the rear end of the slots 64 through the medium of the spring 68. This rearward sliding movement of the power gear 65 will force the key operating sleeve 52 rearwardly upon the section 32 of the shaft 33, and thereby force one of the sets of keys 41 into clutching engagement with the ring gear 77. The ring gear 77 will be put in operative meshing engagement with the gear 84, and the gear 83 likewise will be in mesh with the gear 65.

As the momentum of the engine is speeded up and the speed of the driving shaft 21 is increased, the key operating sleeve 52 will follow along the spiral channels 37 of the shaft section 32 until the speed of the shaft 21 is balanced by the pull of the load on the shaft 33. If the pull or drag of the load is greater than the power transmitted from the shaft 21 when the gear 84 is in operative meshing engagement with the ring 77, the sleeve 52 will continue to move longitudinally with the shaft section 32 until the rearmost set of keys 41 locks the ring gear 74 in engament with the drum 39 and consequently thereby providing an operative connection between the meshing low gear 87, the ring gear 74, and the drum 39. As the drag or pull upon the shaft 33 is equalized in proportion to the speed of the driving shaft 21 the sleeve 52 will recede and progressively throw the reducing gears 85, 85 and 84 into action through the medium of the keys 41 which will be progressively moved into and out of engagement with the respective ring gears cooperating therewith. The spring 36 will tend to force the sleeve 52 forwardly and the notches 58 are so formed on the head or flange 55 as to cause the keys of one ring gear to be withdrawn as the next succeeding keys of the adjoining ring gear are moved into clutching position. When the relation of the pull or drag on the driven shaft 33 becomes normal with respect to the driving shaft 21, where the parts would be normally moved or shifted to high gear or direct drive, the sleeve 52 will continue to move forwardly and by contacting with the rear face of the gear 65 the gear 65 will be pushed forwardly against the compression of the spring 68 thereby moving the gear 65 out of meshing engagement with the gear 83 and forcing the keys in the forward end of the drum 39 into clutching engagement with the from an inactive to a meshing engagement with said drive gear, and said inertia disc having radiating weighted arms.

5. In a speed changing device, the combination with a driving shaft and a driven shaft, a series of reducing gears of different ratios mounted adjacent the driven shaft, a driving gear for rotating the reducing gears, a power gear carried by the driving shaft and slidably mounted on the driving shaft, means for automatically shifting the power gear into mesh with the driving gear, a drum carried by the driven shaft, ring gears carried by said drum, keys carried by the drum and progressively movable into and out of clutching engagement with the ring gears for individually locking the ring gears upon the drum to rotate therewith, a key for locking said drum with said driving shaft, a key operating sleeve slidably mounted upon the driven shaft and contacting with said power gear, the sleeve having means for engaging said keys to progressively move the keys into and out of locking position, said driven shaft having spiral channels, means on said sleeve fitting in the channels for drawing the sleeve longitudinally of the driven shaft, and a spring mounted upon the driven shaft and normally urging said sleeve to a forward position and to a position to lock the drum in engagement with the driving shaft.

6. In a speed changing device, the combination with a driving shaft and a driven shaft, a series of reducing gears of different ratios mounted adjacent the driven shaft, a driving gear for rotating the reducing gears, a power gear carried by the driving shaft and slidably mounted on the driving shaft, means for automatically shifting the power gear into mesh with the driving gear, a drum carried by the driven shaft, ring gears carried by said drum, keys carried by the drum and progressively movable into and out of clutching engagement with the ring gears for individually locking the ring gears upon the drum to rotate therewith, a key for locking said drum with said driving shaft, a key operating sleeve slidably mounted upon the driven shaft and contacting with said power gear, the sleeve having means for engaging said keys to progressively move the keys into and out of locking position, said driven shaft having spiral channels, means on said sleeve fitting in the channels for drawing the sleeve longitudinally of the driven shaft, a spring mounted upon the driven shaft and normally urging said sleeve to a forward position and to a position to lock the drum in engagement with the driving shaft, an inertia disc mounted upon said driving shaft, worm threads formed on the driving shaft for moving the inertia disc inwardly toward the power gear, pushing pins interposed between the inertia disc and power gear for pushing the power gear into mesh with the driving gear as said inertia disc moves inwardly toward the power gear, the power gear also moving said sleeve to a position to lock the forward ring gear into driving relation with respect to the drum for imparting rotary movement from the drive shaft through the power gear, through the driving gear, through the reducing gear, through the inner ring gear to the drum, and finally to the driven shaft.

7. In a speed changing device, the combination with a driving shaft and a driven shaft, a series of reducing gears of different ratios mounted adjacent the driven shaft, a driving gear for rotating the reducing gears, a power gear carried by the driving shaft and slidably mounted on the driving shaft, means for automatically shifting driving shaft, the power gear into mesh with the driving gear, a drum carried by the driven shaft, ring gears carried by said drum, keys carried by the drum and progressively movable into and out of clutching engagement with the ring gears for individually locking the ring gears upon the drum to rotate therewith, a key for locking said drum with said driving shaft, a key operating sleeve slidably mounted upon the driven shaft and contacting with said power gear, the sleeve having means for engaging said keys to progressively move the keys into and out of locking position, said driven shaft having spiral channels, means on said sleeve fitting in the channels for drawing the sleeve longitudinally of the driven shaft, a spring mounted upon the driven shaft and normally urging said sleeve to a forward position and to a position to lock the drum in engagement with the driving shaft, each key having an enlarged rounded outer end and a reduced shank, said shank being tapered at its lower end, said sleeve being provided with inclined notches to facilitate the riding of the key over said sleeve, and each key also having notches in the side thereof, spring pressed plungers engaging the notches for frictionally holding said keys against accidental shifting movement.

8. In a speed changing device, the combination with a driving shaft and a driven shaft, automatic gear shifting means for imparting rotary movement from the driving shaft to the driven shaft, the driven shaft comprising a forward and a rear section arranged in end abutting relation, a longitudinally shiftable gear carried by one section and shiftable to an overlapping position with respect to both sections of the driven shaft, a spaced driving pinion carried by one section of the driving shaft, a reversing gear train located adjacent the driven shaft and anchored against bodily shiftable movement, a supporting pin carried above said reversing gear train, a clutch arm slidably suspended upon said pin and shiftable longitudinally of the pin, means for shifting said clutch arm and said clutch arm engaging said longitudinally shiftable gear and said spaced driving pinion for shifting the gear and pinion in unison longitudinally whereby the gears and pinions may be brought into and moved out of mesh with said reversing gear train, said clutch arm also constituting means for holding said gear and pinion in set respective spaced relation.

JOSEPH C. COEN.